(12) United States Patent
Haacke

(10) Patent No.: US 9,777,854 B2
(45) Date of Patent: Oct. 3, 2017

(54) SAFETY VALVE

(71) Applicant: LESER GmbH & Co. KG, Hamburg (DE)

(72) Inventor: Ulrich Haacke, Hamburg (DE)

(73) Assignee: LESER GmbH & Co. KG, Hamburg (DE)

(*) Notice: Subject to any disclaimer, the term of this patent is extended or adjusted under 35 U.S.C. 154(b) by 0 days.

(21) Appl. No.: 14/728,283

(22) Filed: Jun. 2, 2015

(65) Prior Publication Data
US 2015/0345650 A1 Dec. 3, 2015

(30) Foreign Application Priority Data
Jun. 3, 2014 (DE) .................. 10 2014 210 431

(51) Int. Cl.
F16K 15/02 (2006.01)
F16K 17/02 (2006.01)
(Continued)

(52) U.S. Cl.
CPC ............ F16K 17/02 (2013.01); F16K 1/34 (2013.01); F16K 1/36 (2013.01); F16K 17/0466 (2013.01);
(Continued)

(58) Field of Classification Search
CPC ........ F16K 1/36; F16K 17/0466; F16K 17/02; F16K 17/04; F16K 1/34
(Continued)

(56) References Cited

U.S. PATENT DOCUMENTS 2,670,759 A * 3/1954 St Clair .............. F16K 17/0426
137/160
2,683,464 A 7/1954 St. Clair
(Continued)

FOREIGN PATENT DOCUMENTS

DE 1650577 B1 4/1971
DE 2627233 A1 12/1977
(Continued)

OTHER PUBLICATIONS

Office Action issued Jan. 26, 2015 in DE Application No. 10 2014 210 431.9.
(Continued)

Primary Examiner — Craig Schneider
Assistant Examiner — P. Macade Nichols
(74) Attorney, Agent, or Firm — Panitch Schwarze Belisario & Nadel LLP

(57) ABSTRACT

A safety valve has a valve seat (8) and a sealing body (12) movable relative to the valve seat (8) along a first axis (X), the sealing body being biased with a holding force ($F_H$) along this first axis (X) in the direction of the valve seat (8). A sealing element (24) is arranged on the sealing body (12) in a manner such that with one first side (32) it can be brought into sealing contact with the valve seat (8). A pressure surface situated on a second side (34) of the sealing element (24), which is opposite to the first side (32), is connected via a pressure channel (40) to a pressure region (4) surrounded by the valve seat (8). The sealing body (12) has a contact surface (25) coming to bear on a rest surface (10) in the closed condition of the safety valve.

19 Claims, 2 Drawing Sheets

(51) Int. Cl.
     *F16K 31/12*      (2006.01)
     *F16K 1/34*       (2006.01)
     *F16K 1/36*       (2006.01)
     *F16K 17/04*      (2006.01)

(52) U.S. Cl.
     CPC ......... F16K 31/12 (2013.01); *Y10T 137/7879* (2015.04)

(58) Field of Classification Search
     USPC ........ 251/359, 364, 333, 334; 137/843, 535, 137/540
     See application file for complete search history.

(56) References Cited

U.S. PATENT DOCUMENTS 3,433,250 A     3/1969   Hagihara
4,543,987 A * 10/1985   Ekeleme, Jr. ....... F16K 17/0413
                                                            137/522

FOREIGN PATENT DOCUMENTS

| DE | 202008014555 U1 | 2/2009 |
| DE | 202011109263 U1 | 2/2012 |
| EP | 2182258 A1 | 5/2010 |
| GB | 2137736 A | 10/1984 |

OTHER PUBLICATIONS

Extended European Search Report issued Oct. 14, 2015 in EP Application No. 15168658.

\* cited by examiner

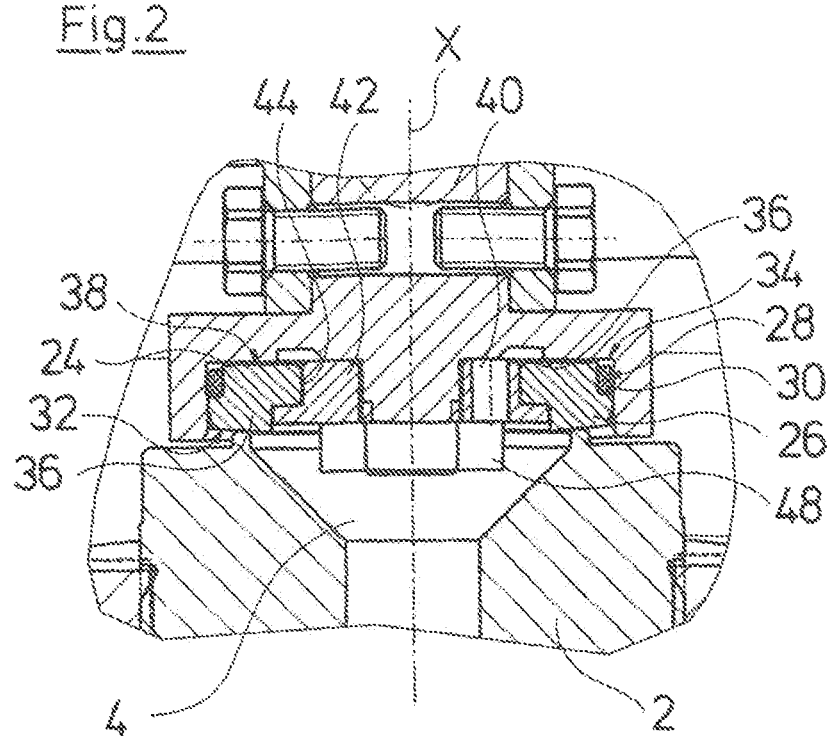
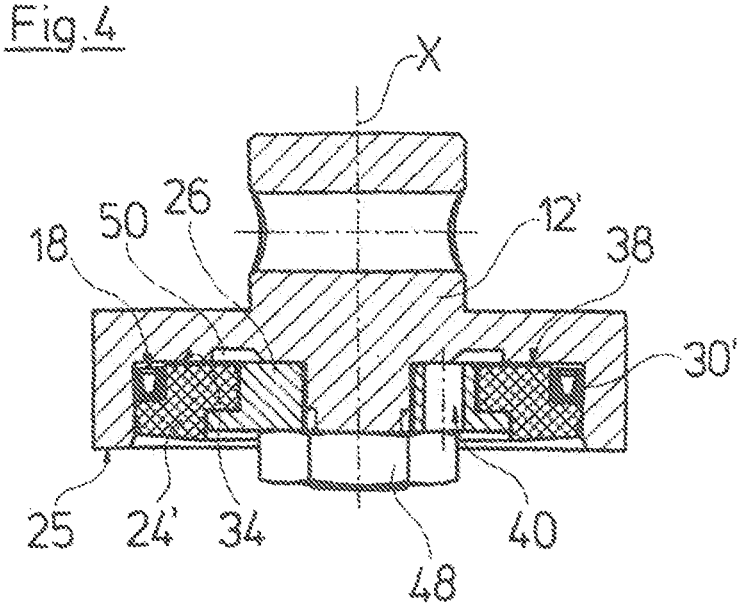

SAFETY VALVE

BACKGROUND OF THE INVENTION

The invention relates to a safety valve having a valve seat and a biased sealing body.

With known safety valves, a sealing disc in the closed condition of the safety valve is pressed onto a valve seat with a certain holding force. If a pressure of a medium acting against the sealing disc exceeds a predefined limit pressure effecting a force upon the sealing disc, which is greater than the defined holding force, then the sealing disc is pressed away from the valve seat by the medium, and the medium can escape through the safety valve, until the pressure has reduced to such an extent that the force upon the sealing disc arising due to the pressure is smaller than the holding force, so that the sealing element bears against the valve seat again in a sealing manner.

If the pressure of the medium in the pressure region in the valve seat reaches a value which lies close to the limit pressure for opening the safety valve, then there exists the problem of holding the sealing disc on the valve seat in a completely sealing manner at this pressure. Contamination, for example, can settle on the valve seat, or the valve seat itself or the sealing disc can de-form slightly, in particular with a frequent lifting from the valve seat and pressing onto the valve seat, so that the sealing disc possibly no longer sealingly bears on the valve seat, even on reaching pressures in the pressure region which are lower than the defined limit pressure.

BRIEF SUMMARY OF THE INVENTION

Against this background, it is an object of the invention to create a safety valve, with which a reliable sealing is also ensured close to the limit pressure or activation pressure.

According to the invention, this object is achieved by a safety valve having a valve seat and having a sealing body which is movable relative to the valve seat along a first axis and which is biased having a holding force along this first axis in the direction of the valve seat. A sealing element is arranged on the sealing body in a manner such that, with a first side, it can be brought into sealing contact with the valve seat. A pressure surface situated on a second side of the sealing element, which is opposite to the first side of the sealing element, is connected via at least one pressure channel to a pressure region surrounded by the valve seat. A contact surface is arranged on the sealing body, the contact surface coming to bear on a rest surface in the closed condition of the safety valve.

Advantageous embodiments are specified in the following description, claims and the drawings.

The basic concept of the invention is for a sealing of the valve seat to be effected via a pressing of the sealing element upon the valve seat in a manner depending on the pressure of a medium in a space closed by the safety valve. The greater the pressure of the medium, the more strongly is the sealing element pressed upon the valve seat. The holding force however does not simultaneously act upon the sealing element and the valve seat, but is accommodated by the rest surface.

The sealing element and the sealing body are preferably two separate components, which are further preferably manufactured from different materials. The sealing element can thus be optimized with regard to its sealing characteristics, whereas the sealing body can be formed from a material which is optimized for force transmission.

The medium is located in a pressure region which is surrounded by the valve seat, and via the pressure channel among other things also distributes along the second side of the sealing element. If now the pressure of the medium in the pressure region increases, then this pressure via the pressure channel acts upon the second side of the sealing element. Thus, a force is produced upon the sealing element by way of the medium, in a manner dependent on the size of the surface of the second side which is subjected to pressure. This force acts upon the sealing element in the direction of the valve seat on account of the alignment of the first side and the second side of the sealing element, which are away from one another, and the first side can thus be pressed onto the valve seat by this force. The sealed contact of the sealing element on the valve seat is thus effected solely by way of the pressure of the medium, independently of the holding force which acts upon the sealing body.

If the pressure in the pressure region surrounded by the valve seat increases, then on the one hand the sealing element is pressed against the valve seat via the pressure channel. The pressure in the pressure region on the other hand simultaneously acts upon the sealing body counter to the holding force. The complete sealing body moves in the direction of the first axis counter to the holding force, if the pressing force produced by the pressure in the pressure region exceeds the holding force, wherein the sealing body with its contact surface lifts from the rest surface. The sealing element is then also co-moved away from the valve seat by way of this movement, so that the valve is opened, so that a pressure relief from the pressure region is possible. If the pressure in the pressure region reduces again to such an extent that the pressing force produced by the pressure becomes smaller than the holding force, then the sealing body is moved by way of the holding force back into its starting position, in which the contact surface bears on the rest surface and the sealing body comes to sealingly lie on the valve seat.

The contact surface and/or the rest surface can each be designed as an annular surface which comes to bear on one another. Alternatively, the contact surface and/or rest surface can also be designed such that they do not extend over the whole periphery about the first axis, but are arranged centrally or only on one or more peripheral regions. Thus, the rest surface and/or contact surface can be designed, for example, as several individual surfaces which are preferably arranged distributed over the periphery. This means that several contact surfaces and several rest surfaces are created in this manner, wherein usefully each contact surface comes to bear on an opposite rest surface.

The contact surface can be designed as one piece with the sealing body or, however, can be arranged on a component connected to the sealing body. Also, several components can be connected to the sealing body and thus several contact surfaces created, which are preferably spaced from one another.

The sealing body can thus comprise at least one contact element, on which at least one contact surface is formed. This contact element can be connected to the remaining structure of the sealing body or be designed as one piece with this.

The sealing element is preferably movable relative to the sealing body, in particular with a defined play. Thus, the sealing contact of the sealing element on the valve seat is ensured in a manner such that the sealing element in the case of an increase of the pressure of the medium can be pressed onto the valve seat without the sealing body thereby changing its position with respect to the valve seat. Preferably, the movability of the sealing element relative to the sealing body is designed such that the sealing element is also movable relative to the sealing body when this sealing body bears on the rest surface. The bearing contact of the sealing element on the valve seat thus remains ensured, even close to the limit pressure.

Thereby, it is particularly advantageous for the sealing element to be movable along the first axis. Thus, the sealing element is movable relative to the sealing body, and the sealing body is movable relative to the valve seat, along the same axis. The sealing element can thus bear on the valve seat in a sealing manner, independently of the precise axial positioning of the sealing body on the contact surface. The sealing element is thus co-moved along the first axis, in order to open the valve, if the safety valve is in a closed condition and the sealing body is spaced from the rest surface by an amount which is greater than the axial movability or axial play of the sealing element to the sealing body.

The sealing element is preferably designed such that it carries out a purely linear movement relative to the sealing body and does not pivot or bend. A rigid material can therefore be applied as a sealing element. A plane contact on the valve seat with good sealing characteristics can moreover be achieved. The sealing element is preferably movable as a whole relative to the sealing body, i.e., it is preferably not merely a section of the sealing element which moves relative to the sealing body.

In a preferred embodiment, the sealing body comprises a holding element which engages around or encompasses the first side of the sealing element. The holding element encompasses at least a part of the first side of the sealing element, i.e., the side which comes into sealing contact with the valve seat. The holding element thus limits the movability of the sealing element and has the effect that the sealing element is axially co-moved with the sealing body, in order to open the valve on exceeding the holding force. If the sealing element is movable along the first axis with respect to the sealing body, then the first side of the sealing element is preferably designed transversely to the first axis and comes into contact with the valve seat with a movement along the first axis. The holding element thereby encompasses the first side of the sealing element, such that the sealing contact of the sealing element on the valve seat is not compromised or even prevented by the holding element. In contrast, the previously mentioned play, within which the sealing element can move with respect to the sealing body, can be rendered possible depending on the design of the holding element. If the sealing body now moves away from the rest surface from the closed condition of the safety valve, then the sealing element can be co-moved away from the sealing seat via the holding element.

The pressure channel is further preferably formed in the holding element and/or in the sealing element. The holding element is thereby arranged on the sealing body in a manner such that the pressure surface of the second side of the sealing element is connected via the pressure channel to the pressure region within the valve seat. The holding element for this is preferably arranged at least adjacently to or in the pressure region, as well as on the pressure surface or adjacently to this. The holding element, for example, can be designed in a disc-like manner, wherein a radially outer part of the periphery of the holding element is in bearing contact with the sealing element. The pressure channel can thereby be designed, for example, as a through-hole parallel to the first axis, in the holding element.

Alternatively or complementarily, a pressure channel which connects the pressure surface of the second side of the sealing element to the pressure region within the valve seat can be formed in or on the sealing element. Thus, a through-hole, for example, can be formed parallel to the first axis, in the sealing element. If, for example, a holding element and a sealing element are arranged bearing on one another, then for example a recess forming a pressure channel can be formed along their surfaces, at which they bear on one another. Thereby, the holding element and sealing element are preferably arranged in a manner such that the pressure channel between the holding element and the sealing element connects the pressure surface of the second side of the sealing element to the pressure region within the valve seat, in accordance with the previous description.

The sealing body preferably comprises a recess which is opened in the direction of the valve seat, and in which the sealing element and/or the holding element are at least partly arranged. The recess is thus designed opened facing the valve seat. For example, it can be designed as a deepening in the sealing body, and have a circular shape transverse to the first axis, which is to say the recess can be peripherally surrounded by an edge or collar of the sealing body. The recess is thereby designed in manner such that the sealing element and/or the holding element can be arranged at least partly in it. The sealing element can thus be arranged between the edge of the sealing body and the holding element, if the holding element, for example, continues to be arranged together with the sealing element in the recess, and this can limit the movability of the sealing element transverse to the first axis. Complimentarily, the holding element can encompass a part of the sealing element as described, in a manner such that the sealing element is movable in the recess along the first axis within a certain play, wherein the sealing element preferably at least with an axial section always remains within the recess, i.e. within the surrounding edge.

The first side of the sealing element which comes into contact with the valve seat is preferably designed away from the recess and is arranged in the direction of the valve seat. As described, the pressure surface of the second side of the sealing element is advantageously designed facing the sealing body. It is thus preferably located within the recess.

A pressure space is particularly preferably formed between the pressure surface of the sealing element and a first surface of the sealing body which lies opposite the pressure surface, wherein the pressure space is connected via the pressure channel to the pressure region within the valve seat. The medium can thus distribute in the pressure space via the pressure channel. The sealing body as well as the sealing element then each have a surface which is impinged by the medium and upon which a force acts on account of the pressure of the medium, depending on the respective surface size of the impinged surface.

The force which acts upon the first surface of the sealing body on account of the pressure as a counter force counteracts the holding force. The contact surface of the sealing body can be lifted from the rest surface from the closed condition of the safely valve by way of an adequate pressure of the medium which exceeds a limit pressure corresponding to the holding force, if this counter force is greater than the holding force. Moreover, the sealing element can also thereby be moved out of its sealing contact on the valve seat, if the travel of the sealing body is sufficiently large. A pressure-dependent opening of the safety valve from its closed condition is thus effected, wherein the release of the sealing element from the valve seat is not dependent on the pressure of the medium upon the sealing element, but on the pressure which acts upon the first surface of the sealing body.

The pressure space is advantageously the part of the recess which is enclosed by the sealing body and the second side of the sealing element, if the sealing element is arranged in a recess of the sealing body.

In a particularly preferred embodiment, the pressure surface of the sealing element in a direction transverse to the first axis has a larger surface than a part-surface of the first side of the sealing element, the part-surface being enclosed by the valve seat in the closed condition of the safety valve. In the closed condition of the safety valve, the part-surface is that section of this first side which is enclosed by the valve seat and which can be impinged by the medium in the inside of the valve seat. The force, which the pressure of the medium applies onto this part-surface, opposes the force which is exerted by the pressure of the medium on the pressure surface, i.e. on the distant second side of the sealing element. A greater force acts upon the pressure surface than upon the first side, and the sealing element is thus pressed with its first side against the valve seat, if the surface of the pressure surface of the sealing element in a direction transverse to the first axis is greater than the mentioned part-surface of the first side, wherein the pressing force increases with an increasing pressure.

The rest surface is preferably formed within or outside the valve seat. The sealing body with its contact surface bears radially outwardly adjacently to the valve seat if the rest surface is formed at the outer periphery of the valve seat. Thereby, the contact surface and the rest surface are advantageously designed transversely, preferably perpendicularly to the first axis. The surface normal of the contact surface can thus be parallel to the first axis and thus be in the movement direction of the sealing body, which permits a stable contact on the rest surface which is biased by the holding force.

If the rest surface is formed within the valve seat, then the sealing element for example can comprise a recess, through which a part of the sealing body or for example the holding element can be led. This led-through part of the sealing body or of the holding element can comprise the contact surface, which in the closed condition of the safety valve is in contact with the rest surface, which can thereby be arranged in the inside of the valve seat. The recess in the sealing element can thereby be designed in such a wide manner that the part of the sealing body which engages through this recess does not completely fill this out, but the pressure channel is formed peripherally between this part and the sealing element.

Particularly preferably, the rest surface peripherally surrounds the valve seat and is preferably designed as one piece with this. The rest surface can thereby surround the valve seat at its inner and/or outer periphery as a closed ring. However, it is alternatively also possible to design the rest surface in only one section of the peripheral extension. Moreover, it is possible to design the rest surface in the form of several part-surfaces which are preferably spaced from one another in the peripheral direction. The rest surface can preferably be designed as one piece with the valve seat, independently of whether it is designed as a single part-surface or in the form of several part-surfaces. The valve seat and the rest surface can thus be formed in the same component, for example via a material-removing machining. This reduces the number of individual parts of the safety valve and the assembly effort which this entails.

The rest surface can alternatively also be formed on a separate component or on several separate components which are connected to the component carrying the valve seat, in a suitable manner, for example screwed or welded.

In a particularly preferred embodiment, a preferably elastic seal is arranged between the sealing element and the sealing body, along an outer periphery of the pressure surface on the sealing element. The seal can be designed, for example, as an O-ring or as a resilient seal such as a spring-biased seal. The seal can thereby be designed as a spring-biased seal with a sealing lip. The seal can be arranged on the sealing body and/or on the sealing element, so that it creates a seal between the sealing body and the sealing element. The seal can also be designed as one piece with the sealing element, or the sealing element at the periphery of the pressure surface can itself be in sealing contact with the sealing body.

The seal can be manufactured of any suitable material, in particular plastic, for example it can be formed of a fluorine-containing plastic. Plastics having a fluorine component have very high chemical robustness and can also be applied in a very wide temperature range, without the mechanical characteristics of the plastic thereby changing substantially.

The pressure surface and the first side of the sealing body preferably define a pressure space, wherein this is closed to the outside in a pressure-tight manner on account of the arrangement of the seal between the sealing element and the sealing body. The pressure space then only still remains connected to the pressure region within the valve seat via the pressure channel. The seal particularly preferably comes to bear on the inner periphery of a peripheral edge of a recess in the sealing body, in which the sealing element is situated.

The seal can advantageously be designed such that the desired movability of the sealing element with respect to the sealing body is not restricted, but is ensured for example by way of the elasticity of the seal, if the sealing element is arranged in a movable manner with respect to the sealing body.

According to a particular embodiment, the sealing element and the seal are designed as one piece. The sealing element, for example on the surface facing the sealing body, can be shaped such that it forms a seal with the previously described characteristics. Alternatively or additionally, the sealing element in different sections can also comprise different materials or due to their shaping can have different mechanical characteristics, so that the region of the sealing element which forms the seal for example can be designed in a more elastic manner than the remaining part of the sealing element. The region of the sealing element which forms the seal can project in a manner such that a surface of the sealing body preferably comes into sealing contact with the region of the sealing element which forms the seal, when pressing the sealing element onto the sealing body. The single-piece design of the sealing element with the seal permits a simplified assembly and reliable sealing.

The seal is particularly preferably arranged in a groove which is formed peripherally of the first axis, on the outer periphery of the sealing element. The preferably elastic seal is thereby arranged in the groove in a manner such that the sealing body is in sealing contact with the sealing element via the seal. If the sealing body for example comprises a recess which is open in the direction of the valve seat, then the seal can be arranged radially to the first axis between a peripheral edge of the sealing body and the sealing element.

The seal is preferably arranged in a groove which is formed on an inner periphery of the sealing body. The seal is arranged in the groove analogously to the previous description, in a manner such that the sealing body is in sealing contact with the sealing element via the seal. The seal is thereby in contact with the sealing body preferably along the whole inner periphery of this.

In a particularly preferred embodiment, the sealing element is formed from an elastic or metallic material. A sealing element which is formed from an elastic material, in the closed condition of the safety valve, permits a pressure-tight bearing contact of the sealing element onto the valve seat, with which the sealing element presses onto the valve seat in a manner such that the sealing element is elastically deformed and the valve seat is sealingly enclosed by the elastic material.

A sealing element formed from metallic material has a long service life. Thus, for example, it can be more durable with regard to certain media than an elastic material and have a large shape stability.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings:

FIG. 2 is an enlarged sectional view of the detail II of the safety valve according to FIG. 1;

FIG. 4 is a longitudinal section of an alternative embodiment of a sealing body of the safety valve according to FIGS. 1 and 2.

DETAILED DESCRIPTION OF THE INVENTION

Figure 1:
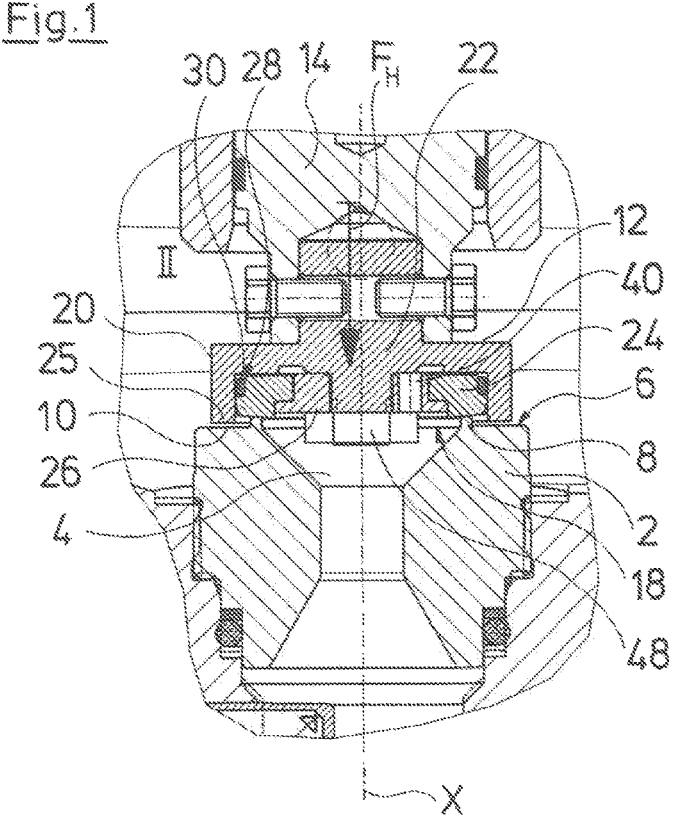
FIG. 1 is a schematic, partial longitudinal section view of a safety valve according to an embodiment of the invention.

A safety valve which is represented schematically in FIG. 1 comprises a valve body 2 which surrounds a pressure region 4 which leads a medium. A valve seat 8 which is radially symmetrical about a longitudinal axis X of the valve body 2 and formed on a face side 6 of the valve body 2 formed perpendicularly to the longitudinal axis X, extends in the form of an annular projection parallel to the longitudinal axis X about the pressure region 4. Unless described otherwise hereinafter, the longitudinal axis X is to be understood as the symmetry and movement axis of the subsequently described design of the safety valve. A rest surface 10 is formed transversely to the longitudinal axis X, laterally or radially outside the valve seat 8 on the face side 6 of the valve body 2.

A disc-shaped sealing body 12 is arranged lying opposite the face side 6 of the valve body 2, along the longitudinal axis X. The sealing body 12 is biased by a holding force $F_H$ which acts along the longitudinal axis X in the direction of the valve body 2. A plunger 14, via which a pilot-controlled biasing of the sealing body 12 in the direction of the valve seat 2 is rendered possible, can be arranged at a side of the sealing body 12 which is away from the valve body 8, i.e., the biasing of the sealing body 12 is effected in a pressure-dependent manner. A spring preloading or spring biasing of the sealing body 12 in the direction of the valve seat 8 with the holding force $F_H$ can alternatively be envisaged.

The sealing body 12 comprises an annulus-shaped recess 18, which faces the valve seat 8 and which at the outer periphery is delimited by a collar or edge 20 of the sealing body 12, the collar or edge extending to the face side 6, and is centrally delimited by a pin (stub) 22 of the sealing body 12, which extends in the direction of the longitudinal axis X to the face side 6. In the closed condition of the safety valve, a contact surface 25 formed by the face side of the edge 20 bears on the rest surface 10, i.e., the sealing body 12 is in contact with the valve body 2 via the holding force $F_H$. The flow of force thereby does not run via the valve seat 8, but via the contact surface 25 and the rest surface 10.

An annulus-shaped sealing element 24, as well as a holding element 26 which is likewise designed in an annulus-shaped manner, is arranged within the recess 18. Thereby, the holding element 26 is arranged peripherally surrounding the pin 22 and is held in the recess via a nut 48. The sealing element 24 bears on the edge 20 of the sealing body 12, at the inner periphery. The sealing element 24 in its outer periphery and peripherally of the longitudinal axis X comprises a groove 28, in which an O-ring 30 is arranged as an elastic seal, with which the sealing element 24 in the recess 18 bears on the inner periphery of the edge 20 in a pressure-tight manner.

The sealing element 24 is preferably made of plastic, in particular of fluoropolymers. With this, it is designed in a resistant manner with regard to different fluids and/or gases. With regard to the application, it can be advantageous if the sealing element 24 has a certain elasticity, or however can withstand high pressures without thereby being deformed. The sealing element 24 can alternatively also be formed from metal or from a metal alloy.

The holding element 26 is radially arranged in the recess 18 between the pin 22 and the sealing element 24, so that it annularly surrounds the pin. The holding element 26 is surrounded by the medium in the closed condition of the safety valve. The sealing element 24 in the closed condition of the safety valve, with a first side 32 facing the face side 6 of the valve body 2 bears on the valve seat 8 of the valve body 2 (FIG. 2). The sealing body 12 in the recess 18 has a first surface 36 which faces the valve seat 8 and which lies opposite a second side 34 of the sealing element 22. The second side 34 is thereby formed on the sealing element 24, away from the first side 32. A pressure space 38 is thereby formed in the inside of the recess 18, between the second side 34 of the sealing element 24 and the first surface 36 of the sealing body 12.

The holding element 26 comprises a pressure channel 40, which extends parallel to the longitudinal axis X as a through-hole and connects the pressure region 4 in the inside of the valve seat 8 to the pressure space 38. This means that the medium is located in the pressure channel 40 and in the pressure space 38 and everywhere has the same pressure as it also has in the pressure region 4.

The sealing element 24 on its inner periphery facing the holding element 26 comprises a slot or step extending transversely to the longitudinal axis X. The holding element 26 at its outer periphery comprises a catch (lug) element 42, which extends radially outward and which has a positive fit with the slot of the sealing element 24. The catch element 42 engages positively into the slot of the sealing element 24 in a manner such that the sealing element 24 is limited in its movement possibility relative to the sealing body 12 in the direction of the longitudinal axis X. The catch element 42 thereby comprises a catch surface 44, which is designed transversely to the longitudinal axis X on a side of the catch 42 which is away from the face side 6 of the valve body 2.

This catch surface bears on the first side 32 of the sealing element 24 in the step at its inner periphery and thus encompasses the sealing element 24 from its first side 32. The holding element 26 is preferably arranged on the sealing body 12 in a manner such that the catch surface 44 has such a distance to the first surface 36 of the sealing body 12, that a certain play is formed along the longitudinal axis X between the sealing element 24 and the catch element 42, within which play the sealing element 24 can move axially relative to the sealing body 12.

The holding element 26 thus with its catch element 42 limits the movability of the sealing element 24 along the longitudinal axis X in the direction of the valve body 2. A thread, on which a nut 48 is screwed, such that the nut 48 fastens the holding element 26 on the sealing body 12, is formed on the pin 22 of the sealing body 12 which extends in the direction of the valve body 2. Other suitable fasteners for fastening the holding element 22 on the sealing body 2 can also be arranged alternatively to the nut 48, wherein for this the pin 22 of the sealing body 12 can also have another suitably adapted design. The nut 48 or an alternative suitable fastener is designed in a manner such that the pressure channel 40 formed in the holding element 26 is not closed due to their arrangement, and thus the connection between the pressure region 4 of the valve body 2 and the pressure channel 40 as well as the pressure space 38 is not interrupted.

Figure 3:
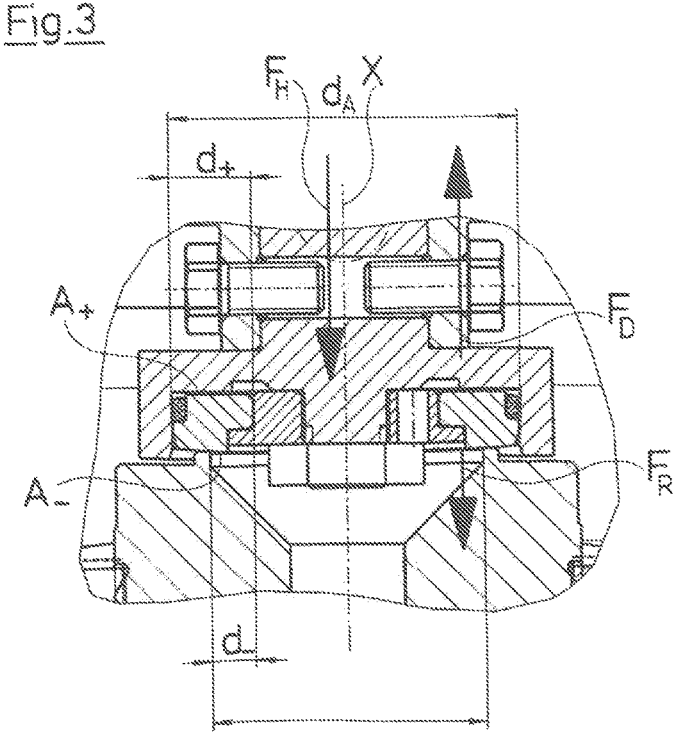
FIG. 3 is an enlarged sectional view of a further representation of the detail II from FIG. 1.

In the closed condition of the safety valve, a force which is effected by the same pressure p of the medium which prevails on the first and second side 32, 34, acts in each case upon the sealing element 24 upon its first side 32 as well as upon its second side 34 (FIGS. 2, 3). Whereas the force on the first side 32 is directed away from the valve seat, the force on the second side 34 is directed in the direction of the safety valve seat. The forces thus act counter to one another. The active surface A− of the first side 32 is the annulus-shaped, pressure-impinged surface of the sealing element 24 transverse to the longitudinal axis X, the surface being enclosed by the valve seat 8 and surrounding the holding element. The active surface A− thereby has a radial annular width d−. The active surface $A_+$ on the second side 34 of the sealing element 24 is the annulus-shaped, pressure-impinged surface which faces the sealing body 12 and the pressure space 38. The active surface $A_+$ thereby has a radial annular width $d_+$ (see FIG. 3). The sealing element is designed in a manner such that the active surface $A_+$ is larger than the active surface A−, i.e., that with a pressure p of the medium, the sealing element 24 is pressed in the direction of the valve seat 8 with a resulting force $F_R \approx p(A_+$ minus A−), and thus comes to bear on the valve seat 8 in a sealing manner.

Forces which are caused by the pressure of the medium also still act on the sealing body 12 in the direction of the valve seat 2, apart from the holding force $F_H$. The pressure p, in a manner directed away from the face side 6 of the valve body 2, acts upon the surface of the pin 22 and the first surface 36 of the sealing body 12 in the recess 18, thus upon the circular surface $A_D$ with the diameter $d_4$ of the recess 18, from which a force $F_D$ counteracting the holding force $F_H$ and the resulting force $F_R$ results.

The recess 18 has a diameter $d_4$ so that with a limit pressure $p_g$ of the medium, the force $F_D$ which arises on the sealing body 12 by way of the medium and which is directed away from the valve seat 8 is larger than the sum of the holding force $F_H$ and the resulting force $F_R$. Thus, the sealing body 12 is brought out of contact with the rest surface 10 departing from the limit pressure $p_g$. If the axial travel of the sealing body 12 is larger than the axial play of the sealing element 24, the sealing element 24, due to the positive bearing of the catch element 42 of the holding element 26 in the recess of the sealing element 26, is also brought out of contact with the valve seat 8, so that a part of the medium can escape out of the pressure region 4, until the pressure of the medium in the pressure region 4 falls below the limit pressure $p_g$. The force $F_D$ is then no longer greater than the holding force $F_H$. The sealing body 12 moves back, and the sealing element 24 comes back into sealing contact on the valve seat 8, whereas the sealing body 12 with its contact surface 25 comes into contact with the rest surface 10, whereby the safety valve is closed again.

In the alternative embodiment shown in FIG. 4 by way of a sketch, a sealing body 12' is designed similarly to the sealing body 12, and comprises a recess 18, in which a sealing element 24' with a seal having a sealing lip 30' and which is arranged in a groove 28 and is resilient or spring-biased and is arranged with a holding element 26, and these are held in the recess 18 via a nut 48. A resilient or spring-biased seal 30' improves the media compatibility and temperature resistance compared to an O-ring 30. An annulus-shaped slot 50 is designed in the recess 18, in the side of the sealing body 12' which faces the valve seat 8, in a manner such that a radially inner first part of the slot 50 which faces the longitudinal axis X is connected to the pressure channel 40, and a radially outer second part of the slot 50, which is away from the longitudinal axis X, is connected to the pressure space 38. The slot 50 thus permits a connection of the pressure channel 40 designed as a through-hole, to the pressure space 38, wherein this connection runs peripherally about the longitudinal axis X. A pressure impingement of the second side 34 of the sealing element 24', as well as of the side of the sealing body 12' which is formed lying opposite this second side 34, is not only ensured close to the pressure channel 40, but also completely peripherally about the longitudinal axis X. An equally distributed pressure build-up in the pressure space 38 likewise improves a level lifting of the sealing body 12 from the rest surface 10 of the valve body 2.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. A safety valve comprising:
    a valve seat (8) surrounding a pressure region;
    a sealing body (12) movable relative to the valve seat (8) along a first axis (X), the sealing body being biased and having a holding force ($F_H$) along the first axis (X) in a direction of the valve seat (8);
    a sealing element (24) arranged on the sealing body (12) and having a first side (32) to be brought into sealing contact with the valve seat (8) and a second side (34) opposite to the first side (32), and a pressure surface situated on the second side (34) of the sealing element (24) and connected via at least one pressure channel (40) to the pressure region; and
    a contact surface (25) arranged on the sealing body (12), the contact surface coming to bear on a rest surface (10) in a closed condition of the safety valve.

2. The safety valve according to claim 1, wherein the sealing body (12) comprises at least one contact element, on which the contact surface (25) is formed.

3. The safety valve according to claim 1, wherein the sealing element (24) is movable relative to the sealing body (12).

4. The safety valve according to claim 3, wherein the sealing element (24) is movable along the first axis (X).

5. The safety valve according to claim 4, wherein the sealing body (12) comprises a holding element (26) which encompasses the first side (32) of the sealing element (24).

6. The safety valve according to claim 1, wherein the pressure channel (40) is formed in at least one of the holding element (26) and the sealing element (24).

7. The safety valve according to claim 1, wherein sealing body (12) comprises a recess (18) open in the direction of the valve seat (8), the recess (18) being arranged in at least one of the sealing element (24) and the holding element (26).

8. The safety valve according to claim 1, wherein a pressure space (38) is formed between the pressure surface of the sealing element (24) and a first surface (36) of the sealing body (12) lying opposite the pressure surface, wherein the pressure space (38) is connected via the pressure channel (40) to the pressure region (4) within the valve seat (8).

9. The safety valve according to claim 1, wherein the pressure surface of the sealing element (24) in a direction transverse to the first axis (X) has a larger surface ($A_+$) than a part-surface ($A-$) of the first side (32) of the sealing element (24), the part-surface being enclosed by the valve seat (8) in the closed condition of the safety valve.

10. The safety valve according to claim 1, wherein the rest surface (10) is formed within the valve seat (8).

11. The safety valve according to claim 1, wherein the rest surface (10) is formed outside the valve seat (8).

12. The safety valve according to claim 11, wherein the rest surface (10) peripherally surrounds the valve seat (8).

13. The safety valve according to claim 12, wherein the rest surface (10) is designed as one piece with the valve seat (8).

14. The safety valve according to claim 1, wherein an elastic seal (30, 30') is arranged between the sealing element (24) and the sealing body (12) along an outer periphery of the pressure surface ($A_D$).

15. The safety valve according to claim 14, wherein the sealing element (24, 24') and the seal (30, 30') are designed as one piece.

16. The safety valve according to claim 14, wherein the seal (30, 30') is arranged in a groove (28) formed peripherally to the first axis (X) on an outer periphery of the sealing element (24).

17. The safety valve according to claim 14, wherein the seal (30, 30') is arranged in a groove (28) formed peripherally to the first axis (X) on an inner periphery of the sealing body (12).

18. The safety valve according to claim 1, wherein the sealing element (24) comprises an elastic material.

19. The safety valve according to claim 1, wherein the sealing element (24) comprises a metallic material.

\* \* \* \* \*